United States Patent [19]

Otsuki et al.

[11] 4,093,759

[45] June 6, 1978

[54] GLASS CONTAINER COATED WITH POLYURETHANE

[75] Inventors: Akira Otsuki; Michihisa Naito; Yukifumi Mashimo; Akira Ikeda, all of Tokyo, Japan

[73] Assignee: Toyo Ink Manufacturing Co., Ltd., Tokyo, Japan

[21] Appl. No.: 658,789

[22] Filed: Feb. 17, 1976

Related U.S. Application Data

[63] Continuation of Ser. No. 428,586, Dec. 26, 1973, abandoned.

[30] Foreign Application Priority Data

Dec. 23, 1972  Japan ........................ 47-128840

[51] Int. Cl.$^2$ .............................................. B65D 1/02
[52] U.S. Cl. ........................... 428/35; 427/385 A; 428/327; 428/339; 428/425; 215/DIG. 6; 215/12 R
[58] Field of Search ............ 427/385 A; 428/35, 327, 428/339, 425; 260/75 NH, 75 NP, 77.5 PM; 215/DIG. 6, 12 R

[56] References Cited

U.S. PATENT DOCUMENTS

| 3,105,062 | 9/1963 | Graham et al. | 260/75 |
|---|---|---|---|
| 3,178,049 | 4/1965 | Cottet | 215/DIG. 6 |
| 3,341,499 | 9/1967 | Kaiser | 260/75 |
| 3,386,962 | 6/1968 | Damusis | 260/75 |
| 3,428,609 | 2/1969 | Chilvers et al. | 260/75 |
| 3,428,610 | 2/1969 | Klebert | 260/77.5 |
| 3,629,168 | 12/1971 | Ryan | 260/75 |
| 3,666,835 | 5/1972 | Schloss | 260/858 |
| 3,726,835 | 4/1973 | Bertozzi | 260/75 |
| 3,730,927 | 5/1973 | Schloss | 260/858 |
| 3,823,032 | 7/1974 | Ukai | 428/35 |
| 3,889,031 | 6/1975 | Tatsumi et al. | 428/35 |

FOREIGN PATENT DOCUMENTS 2,026,909  12/1970  Germany ........................ 215/DIG. 6

Primary Examiner—Harry J. Gwinnell
Assistant Examiner—Sadie L. Childs
Attorney, Agent, or Firm—Sughrue, Rothwell, Mion, Zinn and Macpeak

[57] ABSTRACT

A process for preventing the scattering of glass fragments in the event of the bursting of a glass container such as a bottle, which comprises coating the surface of the glass container with a resin composition in a thickness of at least 100 microns, said composition comprising a dispersion of (A) a powder with a particle diameter of about 1 to 100 microns of a solid compound capable of reaction with (B) upon heating to form a higher molecular weight cured product, in (B) a normally liquid urethane prepolymer having a molecular weight of at least 400 per isocyanato group, and being capable of forming a film having a tensile strength of at least 300 kg/cm$^2$ and a percent elongation of at least 200%.

4 Claims, No Drawings

GLASS CONTAINER COATED WITH POLYURETHANE

This is a continuation of application Ser. No. 428,586, filed Dec. 26, 1973, now abandoned.

BACKGROUND OF THE INVENTION

1. Field of the Invention

This invention relates to a process for preventing the scattering of glass fragments resulting from the bursting of a glass article such as a bottle by coating the surface of the glass article with a novel urethane resin composition. The process is also effective for protecting the surface of the glass article and for compensating for a reduction in strength ascribable to surface scratches or similar defects.

2. Description of the Prior Art

In order to increase the resistance of glass to bursting, a resin layer is usually coated on a glass surface. Such a resin coating has been applied to safety glass, glass bottles and photographic flash bulbs. Since the bursting of glass is accelerated by surface scratches on the glass article, the crystallization of the surface layer and abrupt changes in temperature, the coating of the glass surface with a resin is effective for preventing the strength of glass from decreasing.

However, coating materials for preventing scattering of glass fragments in the event of bursting of a glass bottle filled with carbonated beverages, beer or a similar gas-forming beverages require different properties from those used for reinforcing or surface-protecting of glass articles. According to the invention of our copending U.S. Pat. application Ser. No. 341,197 filed on Mar. 14, 1973 now abandoned, the coating resin for preventing the scattering of glass fragments caused by the bursting of a filled glass container such as a bottle (for brevity, hereinafter the description will be directed to the coating of bottles) must have an adequate tensile strength (on glass bursting), an adequate percent elongation (on glass bursting) and good adherence to the glass surface. All of these physical properties need not be superior at the same time, because their relationship, especially the relationship between the tensile strength and the percent elongation, is more important for obtaining favorable results.

More specifically, a very high tensile stegnth is not always required, and a suitable value can be determined in accordance with the value of the percent elongation. Thus, high tensile strength is required if the percent elongation is low, and even a relatively low tensile strength can be effective if the percent elongation is high. The lower limit of the tensile strength is about 50 kg/cm$^2$ and that of the percent elongation, about 100%. The preferred ranges of the tensile strength and of the elongation are about 300 to about 600 kg/cm$^2$ and about 200 to 600%, respectively.

An effective thickness of the resin coating is more than about 50 microns if the resin satisfies the above-described requirements, and preferably a thickness of from about 100 to about 200 microns. The optimum thickness is determined in accordance with the glass wall thickness and the inner pressure which the glass bottle to be coated will generally experience.

Methods of reinforcing a glass bottle by coating a film on the surface of a bottle are well known. For example, coating resins for glass bottle are disclosed in U.S. Pat. No. 3,178,049. This patent discloses a method for reinforcing a glass bottle. In contrast, the present invention relates to a method for preventing the scattering of glass fragments resulting from the bursting of a glass bottle by coating the surface of the bottle with a film of a novel urethane resin composition. Accordingly, this invention is quite different from the above-described patent. Furthermore, while a polyurethane resin is exemplified in U.S. Pat. No. 3,178,049 as a resin that can be used, no specific description appears with respect to the nature of the polyurethane resin used.

Many compositions are known for forming polyurethane resin films. For example, U.S. Pat. No. 3,428,609 discloses a process for manufacturing a solution in an organic solvent of a polyurethane. Some of the urethane resin films obtained from the solution possess the physical properties required of films. The composition disclosed in the above patent, however, contains an organic solvent, and it is generally known that compositions requiring an organic solvent are unfavorable since not only are they hazardous to the health of the working personnel but also cause pollution.

A solvent-free polyurethane resin composition is disclosed, for example, in U.S. Pat. No. 3,428,610. This patent describes a method for producing a cross-linked polyurethane, which comprises reacting an intermediate (urethane prepolymer) having a free NCO group with an aromatic diamine as a chain extending agent to form a highly elastic urethane resin. Although the composition thus prepared is suitable for casting, it is not suitable for coating. In addition, the curing after casting is effected by the action of moisture in the air, and from two to eight days are required for curing.

The invention described in our previous application includes a process for coating a glass bottle using solvent-free urethane resin compositions. However, these compositions are of a reactive two-package type having the defect of short storage period (or pot life).

SUMMARY OF THE INVENTION

According to this invention, a urethane resin composition free from solvent and having a long pot life is used. The film prepared from this resin meets the physical requirements for preventing the scattering of glass fragments in the event of the bursting of the bottle. The composition specifically comprises a dispersion of (A) one equivalent of a powder with a particle diameter of 1 to 100 microns of a solid compound having a melting point of more than 20° C capable of reaction with (B) upon heating to form a higher molecular weight cured product in (B) 0.9 to 1.5 equivalents of a normally liquid urethane prepolymer having at least two isocyanato groups in the molecule and having a molecular weight of at least 400 per isocyanato group. The cured composition provides a film having a tensile strength of at least 300 kg/cm$^2$ and percent elongation of at least 200%.

DETAILED DESCRIPTION OF THE INVENTION

U.S. Pat. No. 3,726,835 discloses a casting composition comprising a mixture of a liquid urethane prepolymer and melamine or dicyandiamide. Since this composition is used for casting, it is incapable of forming a film unlike the composition used in the present invention. Furthermore, since the tensile strength and percent elongation of the film are not required in a composition for casting as used in this U.S. patent there is an important difference between the composition disclosed in this U.S. patent and the composition used in the process of the present invention. In U.S. Pat. No. 3,726,835, the mixing ratio between the prepolymer and melamine or dicyandiamine is such that ⅛ to 4 equivalents of the prepolymer is used per equivalent of melamine or dicyandiamide, whereas in the present invention, the required physical properties of the film can be obtained only when the proportion of the prepolymer is within 0.9 to 1.5 equivalents per equivalent of the component (A). In U.S. Pat. 3,726,835, it is not necessary that the particle diameter of the powder solid compound to be reacted be restricted but in the present invention it is essential that the particle diameter of the powder be not more than 100 microns in order to accelerate the formation and curing rate of the film. Furthermore, the molecular weight of the urethane prepolymer is not restricted in U.S. Pat. No. 3,726,835, but in the present invention, the urethane prepolymer should have a molecular weight of at least 400 per isocyanato group in order to obtain a suitable film percent elongation for the effects of the present invention.

Since the composition used in this invention is solvent free, no pollution problems result. In addition, the composition of this invention has a long pot life, e. g., about 3 to 6 months, at room temperature and good workability, and rapidly reacts upon heating, e. g., at temperatures of about 180° to 200° C for about 10 minutes, after coating to form a transparent urethane resin coating. The resulting film has a tensile strength of at least 300 kg/cm² and percent elongation of at least 200%. Further, the film thus obtained has an excellent abrasion resistance. Therefore, a smaller deterioration in the physical strength during transport and shipping, treatment or the like results for the glass containers produced in accordance with the present invention, and further the number which can be recovered and reused can be increased by a factor of 3 or 4 times comparing to that of the conventional glass containers.

The urethane prepolymer which is used for preparing the coating composition in accordance with this invention is a reaction product of 1 equivalent of a polyol having a molecular weight of about 250 to 1500 per one hydroxy group capable of having a molecular weight of at least 400 per isocyanato group after reaction with an isocyanate, such as polypropylene glycol, polyethylene glycol adipate, polybutylene glycol adipate, polytetramethylene glycol, a polyester-polyol, 2,2,4-trimethyl-1,3-pentanediol, trimethylol propane, 1,4-butylene glycol or trimethylhexane diol with 2 equivalents of a diisocyanate having a molecular weight of about 90 to 130 per isocyanato group such as tolylenediisocyanate, isophorone diisocyanate, hexamethylene diisocyanate, xylylene diisocyanate, 4,4'-diphenylmethane diisocyanate or naphthalene diisocyanate. This urethane prepolymer is a liquid at room temperature and forms a urethane resin upon an increase in its molecular weight.

This urethane prepolymer can be prepared by heating 2 equivalents of the diisocyanate in a nitrogen gas stream to 70° to 80° C, adding 1 equivalent of the polyol dropwise over a period of about 1 hour with stirring, and reacting them further for 30 minutes to 2 hours after the polyol has been added.

The solid component of the coating composition used in the present invention is one capable of reacting with the above described liquid component upon heating thereby increasing the molecular weight of the prepolymer, and includes, for example, melamine, benzoguanamine, acetoguanamine, dicyandiamide, an aromatic diamine having a melting point of about 50° C., a polyamine, bisphenol A, an epoxy intermediate, pentaerythritol, trimethylol propane, trimethylol ethane, or an acrylic or vinyl polymer containing a functional group such as a hydroxyl group, an amino group or a carboxyl group. The use of the powdery solid component contributes to the inhibition of the reaction and thereby curing at room temperature and affords a long pot life. In order to obtain a feasible rate of reaction by heating, the size of the powder particles is of importance. If the particle diameter is large, the reaction requires long periods of time, and a uniform film cannot be obtained.

Investigations of the inventors have shown that in order to attain a rapid and feasible reaction rate and to obtain a uniform coating, the particle diameter of the powder should not be greater than 100 microns. It has been found that some of the solid component may be melted by heating after coating and react, but if the particle size of the powder is adjusted to not greater than 100 microns, the solid component undergoes reaction even at a temperature below its melting point to form a uniform film. This discovery was made after investigating the relation between the particle diameter of the solid component and the pot life of the resulting composition, the heating temperature for inducing this reaction and the uniformity of the film, etc. The optimum particle diameter differs depending upon the types of the liquid component and the solid component used, but is generally about 1 to 100 microns. In many cases, the optimum particle diameter is 3 to 10 microns. By adjusting the particle diameter, the heating temperature for curing does not always need to be above the melting point of the solid component, and lower temperatures near the melting point can also induce the curing reaction to form a uniform transparent film.

It is necessary that the ratio of the solid component and the urethane prepolymer be about equivalent ratio, and it is possible to use 0.9 to 1.5 equivalents, of the prepolymer per equivalent of the solid component. Clear films cannot be obtained from compositions in which the proportion of the prepolymer is less than 0.9 equivalent, and the resulting films have insufficient elongation. If, on the other hand, the proportion of the urethane prepolymer is above 1.5 equivalents, the resulting film can be highly elongated, but the film remains tacky and the film also has insufficient tensile strength.

The molecular weight of the prepolymer must be at least 400, preferably 400 to 3,000, per isocyanato group, and films obtained from compositions in which the prepolymer has a molecular weight lower than this have insufficient elongation properties.

The composition to be used in this invention may further contain other ingredients such as fillers, pigments, other resins, etc. so long as they do not lead to the loss of these essential characteristics.

The following Examples and Comparative Examples illustrate the present invention in greater detail. Unless otherwise indicated all parts and percents are by weight.

EXAMPLE 1

A 8:2 by weight mixture (30.7g) of 2,4-tolylene diisocyanate and 2,6-tolylene diisocyanate was maintained at 80° C in a nitrogen gas stream with stirring, and a mixture consisting of 36.8g of PPG 1000 (a polypropylene glycol having a molecular weight of about 1000) and 17.7g of PPG 400 (a polypropylene glycol having a molecular weight of about 400) was added dropwise over the course of 1 hour. The reaction was continued for an additional 30 minutes. Then, 14.8g of a 1:1 mixture of melamine pulverized to an average particle size of 10 microns and PPG 1000 was added, and the resulting mixture was stirred at 70° C for 1 hr. to obtain a coating composition having a viscosity (20° C) of 100,000 centipoises. Although the melting point of melamine is 260° C, if the particle size of the melamine is adjusted to not more than 50 microns, it reacts with the prepolymer at a temperature below 200° C to form a uniform film as a result of curing in about 10 minutes. Since in this Example, the particle diameter of the melamine was 10 microns, the curing could be performed at 180° C in 10 minutes. The film obtained from the composition in this Example has a tensile strength of 400 kg/cm$^2$ and percent elongation of 200%.

Ten grams of the resulting composition was coated on the surface of a beer bottle, and heated for 10 minutes at 180° C to form a coating. Since this bottle had a tough surface coating of urethane resin having a thickness of 200 microns, the coated bottle had resistance to damage or injury. When this bottle with an inner pressure of 5kg/cm$^2$ was dropped onto a concrete floor from a height of 75 cm to break the bottle and evaluate the coating, no scattering of glass fragments was observed.

EXAMPLE 2

Isophorone diisocyanate (39.3g) was maintained at 70° C in a nitrogen gas stream with stirring, and a mixture of 44.2g of polyethylene glycol adipate having a hydroxyl value of 224 and 0.01g of dibutyl tin dilaurarte was added dropwise over the course of 1 hour. The reaction was continued for an additional 2 hours after the addition. Then, the reaction mixture was cooled to 50° C, and 16.5g of benzoguanamine pulverized to an average particle diameter of 3 microns was added. The mixture was stirred using a high speed mixer to form a coating composition having a viscosity (50° C) of 5000 centipoises. A film obtained from this composition had a tensile strength of 350 kg/cm$^2$ and percent elongation of 300%.

Ten grams of this composition was coated on the surface of a beer bottle, and heated at 200° C for 10 minutes to form a uniform coating. When this bottle was tested in the same way as described in Example 1, similar good results were obtained.

EXAMPLE 3

2,4-Tolylene diisocyanate (26.4g) was maintained at 80° C in a nitrogen gas stream with stirring, and a mixture of 37.9g of polybutylene glycol having a hydroxyl value of 112 and 19.0g of polybutylene glycol adipate having a hydroxyl value of 224 was added dropwise over the course of 1 hour. Then, the reaction was continued for an additional one hour. The reaction mixture was then cooled to 50° C, and 16.7g of bisphenol A pulverized to an average particle size of 5 microns was added. The mixture was stirred using a high speed mixer to form a coating composition having a viscosity of 3000 centipoises at 50° C. A film obtained from this composition had a tensile strength of 300 kg/cm$^2$ and percent elongation of 200%.

Ten grams of this composition was coated on the surface of a beer bottle, and heated at 180° C for 10 minutes to form a cured coating. When this bottle was tested in the same way as described in Example 1, similar good results were obtained.

EXAMPLE 4

2,4-Tolylene diisocyanate (27.9g) was heated at 80° C in a nitrogen gas stream with stirring, and 66.6g of polytetramethylene glycol having a hydroxyl value of 135 was added dropwise over the course of 1 hour. The stirring and heating were continued for an additional one hour, and then the reaction mixture was cooled to room temperature (about 20° to 30° C). 5.5g of powdered pentaerythritol having an average particle diameter of 100 microns was added, and the mixture was stirred using a kneader to form a coating composition having a viscosity (20° C) of 10,000 centipoises. This composition had a pot life of 3 months, and a film obtained from this composition had a tensile strength of 400 kg/cm$^2$ and percent elongation of 250%.

This composition was coated on a beer bottle in the same way as described in Example 1, and similar effects were obtained.

COMPARATIVE EXAMPLE 1

A coating composition was prepared in the same way as described in Example 2 except that the amount of isophorone diisocyanate was changed to 49.6g, 29.6g of a polyol composed of glycerol and polypropylene oxide of a molecular weight of 400 (TG 400, a trademark produced by Nippon Soda Co., Ltd.) was used instead of the 44.2g of the polyethylene glycol adipate, and the amount of benzoguanamine was changed to 20.8g. A film obtained from this composition was transparent and had a tensile strength of 200 kg/cm$^2$. However, its percent elongation was only 10%, and the use of this composition as in the present invention failed to provide the desired effect. This is because TG 400 had a molecular weight of 400/3 per hydroxyl group, and the resulting prepolymer had a molecular weight of 355 per isocyanato group which is less than the 400 required in this invention.

COMPARATIVE EXAMPLE 2

Example 2 was repeated except that the amount of benzoguanamine was increased to 33g (thus reducing the equivalent amount of the prepolymer to ½). A film obtained from this composition did not become clear even when heated at 200° C for 10 minutes. It was useless in the present invention.

COMPARATIVE EXAMPLE 3

Example 1 was repeated except that the amount of the mixture of 14.4g of melamine and 7.4g of PPG 1000 was used such that the ½ equivalent of the prepolymer was used. A film obtained from this composition as non-transparent and had a tensile strength of 60 kg/cm$^2$ and percent elongation of 80%. The use of this composition in this invention failed to attain the desired effect.

COMPARATIVE EXAMPLE 4

Example 1 was repeated except that a mixture of 3.7g of melamine and 7.4g of PPG 1000 was used instead of 14.8g of the mixture of melamine and PPG 1000 in a ratio of 1:1 (thus increasing the proportion of the prepolymer to 2 equivalents). A film obtained from this composition had percent elongation of 500%, but a tensile strength of only 100 kg/cm$^2$. The surface of the film remained tacky, and the composition could not be used for coating purposes.

While the invention has been described in detail and with reference to specific embodiments thereof, it will be apparent to one skilled in the art that various changes and modifications can be made therein without departing from the spirit and scope thereof.

What is claimed is:

1. A glass container carrying on the surface thereof a single layer coating of a transparent non-tacky film in a thickness of at least 100 microns and having a tensile strength of at least 300 kg/cm$^2$ and a percent elongation of at least 200%, said film being a cured high molecular weight compound formed by the reaction of a powder having a particle diameter of about 1 to 100 microns of a solid compound having a melting point of more than 20° C. selected from the group consisting of melamine, benzoguanamine, and acetoguanamine with 0.9 to 1.5 equivalents per equivalent of said powder of a urethane prepolymer which is normally liquid and has at least 2 isocyanate groups and has a molecular weight of at least 400 per isocyanate group, said coating having been cured at a temperature of 180° to 200° C.

2. The container of claim 1 wherein said urethane prepolymer is a reaction product of 1 equivalent of a polyol selected from the group consisting of polypropylene glycol, polyethylene glycol adipate, polybutylene glycol adipate, polytetramethylene glycol, a polyester-polyol, trimethylolpropane, 1,4-butylene glycol, trimethylhexanediol, and 2,2,4-trimethyl-1,3-pentanediol, and 2 equivalents of a diisocyanate selected from the group consisting of tolylene diisocyanate, hexamethylene diisocyanate, isophorone diisocyanate, 4,4-diphenylmethane diisocyanate, xylylene diisocyanate and naphthalene diisocyanate.

3. The container of claim 1 wherein said normally solid compound is a powder of melamine or benzoguanamine having a particle diameter of 3 to 10 microns.

4. The container of claim 1 wherein the ratio between said urethane prepolymer and said solid compound is an equivalent ratio.